US012437202B2

(12) United States Patent
Hernandez Rivera et al.

(10) Patent No.: US 12,437,202 B2
(45) Date of Patent: Oct. 7, 2025

(54) HUMAN CHARACTERISTIC NORMALIZATION WITH AN AUTOENCODER

(71) Applicant: Microsoft Technology Licensing, LLC, Redmond, WA (US)

(72) Inventors: Javier Hernandez Rivera, Boston, MA (US); Daniel McDuff, Cambridge, MA (US); Mary P. Czerwinski, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 732 days.

(21) Appl. No.: 17/085,428

(22) Filed: Oct. 30, 2020

(65) Prior Publication Data

US 2022/0138583 A1 May 5, 2022

(51) Int. Cl.
*G06N 3/088* (2023.01)
*G06N 3/04* (2023.01)

(52) U.S. Cl.
CPC ............... *G06N 3/088* (2013.01); *G06N 3/04* (2013.01)

(58) Field of Classification Search
CPC .......... G06N 3/04; G06N 3/045; G06N 3/084; G06N 3/088; G06V 40/174
See application file for complete search history.

(56) References Cited

U.S. PATENT DOCUMENTS

| | | | |
|---|---|---|---|
| 7,356,447 B2 | 4/2008 | Marschner et al. | |
| 8,488,023 B2 | 7/2013 | Bacivarov et al. | |
| 9,552,510 B2 | 1/2017 | Li et al. | |
| 10,552,667 B1 | 2/2020 | Bogan et al. | |
| 2018/0365874 A1* | 12/2018 | Hadap | G06V 40/16 |
| 2018/0373979 A1 | 12/2018 | Wang et al. | |
| 2019/0172243 A1 | 6/2019 | Mishra et al. | |

(Continued)

FOREIGN PATENT DOCUMENTS

| | | |
|---|---|---|
| CN | 100397410 C | 6/2008 |
| CN | 110674774 A | 1/2020 |

(Continued)

OTHER PUBLICATIONS

Chen et al., "VGAN-Based Image Representation Learning for Privacy-Preserving Facial Expression Recognition", Sep. 7, 2018, arXiv:1803.07100, pp. 1-10 (Year: 2018).*

(Continued)

*Primary Examiner* — Brent Johnston Hoover
(74) *Attorney, Agent, or Firm* — Schwegman Lundberg & Woessner, P.A.

(57) ABSTRACT

Generally discussed herein are devices, systems, and methods for. A method can include obtaining a normalizing autoencoder, the normalizing autoencoder trained based on first data samples of a template person and second data samples of a variety of people, normalizing, by the normalizing autoencoder, an input data sample by combining dynamic characteristics of a person in the input data sample with static characteristics in the first data samples, to generate normalized data, and providing the normalized data as input to a classifier model to classify the input data based on the dynamic characteristics of the input data and the static characteristics of the first data samples.

16 Claims, 6 Drawing Sheets

(56) References Cited

U.S. PATENT DOCUMENTS

2019/0279075 A1 9/2019 Liu et al.
2021/0056348 A1* 2/2021 Berlin .................... G06T 11/60

FOREIGN PATENT DOCUMENTS

CN 111160163 A 5/2020
CN 111767842 A 10/2020

OTHER PUBLICATIONS

Chen, et al., "VGAN-Based Image Representation Learning for Privacy-Preserving Facial Expression Recognition", In Proceedings of the IEEE Conference on Computer Vision and Pattern Recognition Workshops, Jun. 18, 2018, pp. 1651-1660.
"International Search Report and Written Opinion Issued in PCT Application No. PCT/US21/053055", Mailed Date: Jan. 26, 2022, 12 Pages.
James, A. P., et al., "Facial emotion recognition using Min-Max similarity classifier", In Proceedings of International Conference on Advances in Computing, Communications and Informatics, Feb. 8, 2017, pp. 1-10.
Liu, Y., et al., "Facial Expression Recognition with Fusion Features Extracted from Salient Facial Areas", In Journal of Sensors, vol. 17, Issue 4, Mar. 29, 2017, 18 Pages.
Qian, Y., et al., "Unsupervised Face Normalization with Extreme Pose and Expression in the Wild", In Proceedings of the IEEE Conference on Computer Vision and Pattern Recognition, Jul. 30, 2019, pp. 9843-9850.
Endicott, S., "NVIDIA Maxine uses AI to improve video calls and conferencing", [online]. (c) Future US, Inc., Retrieved from the Internet: <URL: https://www.windowscentral.com/nvidia-maxine-uses-ai-improve-video-calls-and-conferencing>, (Oct. 5, 2020), 7 Pages.
First Office Action Received for Chinese Application No. 202180073390.3, mailed on Jun. 23, 2025, 13 pages. (English translation Provided).
Communication pursuant to Article 71(3) received in European Application No. 21805698.4, mailed on Jul. 28, 2025, 8 Pages.

* cited by examiner

HUMAN CHARACTERISTIC NORMALIZATION WITH AN AUTOENCODER

BACKGROUND

Among the various applications of human-centered artificial intelligence, facial expression recognition technology has been successfully used in a wide variety of contexts, such as improving human-robot interaction, depression monitoring, estimating patient pain, measuring the engagement of television (TV) viewers, and promoting driver safety. All of this is possible even considering that the meaning of different facial expressions may differ depending on the context. To help quantify facial expressions, researchers often rely on the Facial Action Unit coding system (FACS) which decomposes facial movements into different muscle activations (e.g., AU12 for lip corner puller which is frequently seen during smiles). As with other computer vision domains, this field has experienced significant advances during the last decade due, at least in part, to the advancements of deep neural networks (DNNs) and graphics processing unit (GPU) hardware which have enabled the training of complex models and analysis of large datasets.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Systems, methods, device, and computer or other machine-readable media can provide improvements over prior face normalization techniques. The improvements can include improved performance across data with people with various differences. Typically, face normalization performs well on input data of people with same or similar characteristics as the people represented in the training data. The improvements can be realized using an autoencoder trained and operated in a specified manner, discussed in more detail elsewhere herein.

A method, device, computer-readable medium, a means for, and system for are provided. A device can include processing circuitry, and a memory including instructions that, when executed by the processing circuitry, cause the processing circuitry to perform operations for data normalization. The operations can include normalizing, by a normalizing autoencoder trained based on first data samples of a template person and second data samples of a variety of people, an input data sample by combining dynamic characteristics of a person in the input data sample with static characteristics of the first data samples, to generate normalized data. The static characteristics include characteristics that are the same among the first data samples. The normalized data can be provided as input to a classifier model to classify the input data sample based on the dynamic characteristics of the input data sample and the static characteristics of the first data samples.

The normalizing autoencoder can be trained using a single encoder and multiple decoders, a first decoder of the decoders dedicated to reconstructing the first data samples and a second decoder of the decoders dedicated to reconstructing the second data samples. The encoder can be trained based on a reconstruction loss of both the first and second decoders. The first decoder can be trained based on a reconstruction loss of only the first decoder. The second decoder can be trained based on a reconstruction loss of only the second decoder. During runtime, the normalizing autoencoder can operate using the encoder to compress a representation of the input data sample and the first decoder to construct the normalized data based on the compressed representation. Training can include training the encoder and the second decoder can be performed on a batch of the second data samples followed by training the encoder and the first decoder on a batch of the first data samples, or vice versa.

The first data samples can be images of a template face. The second data samples can be images of a variety of faces. The input data can be an image of a face to be normalized. The classifier model can provide a classification of a facial action unit (FAU) present in the input image. The operations can further include, before normalizing the input data, adjusting angle and pose of the faces in the first and second data samples to be consistent and wherein normalizing is performed based on input data that is adjusted for angle and pose. The static characteristics can include a facial structure and the dynamic characteristics can include mouth formation and eyelid formation.

DETAILED DESCRIPTION

Figure 1:
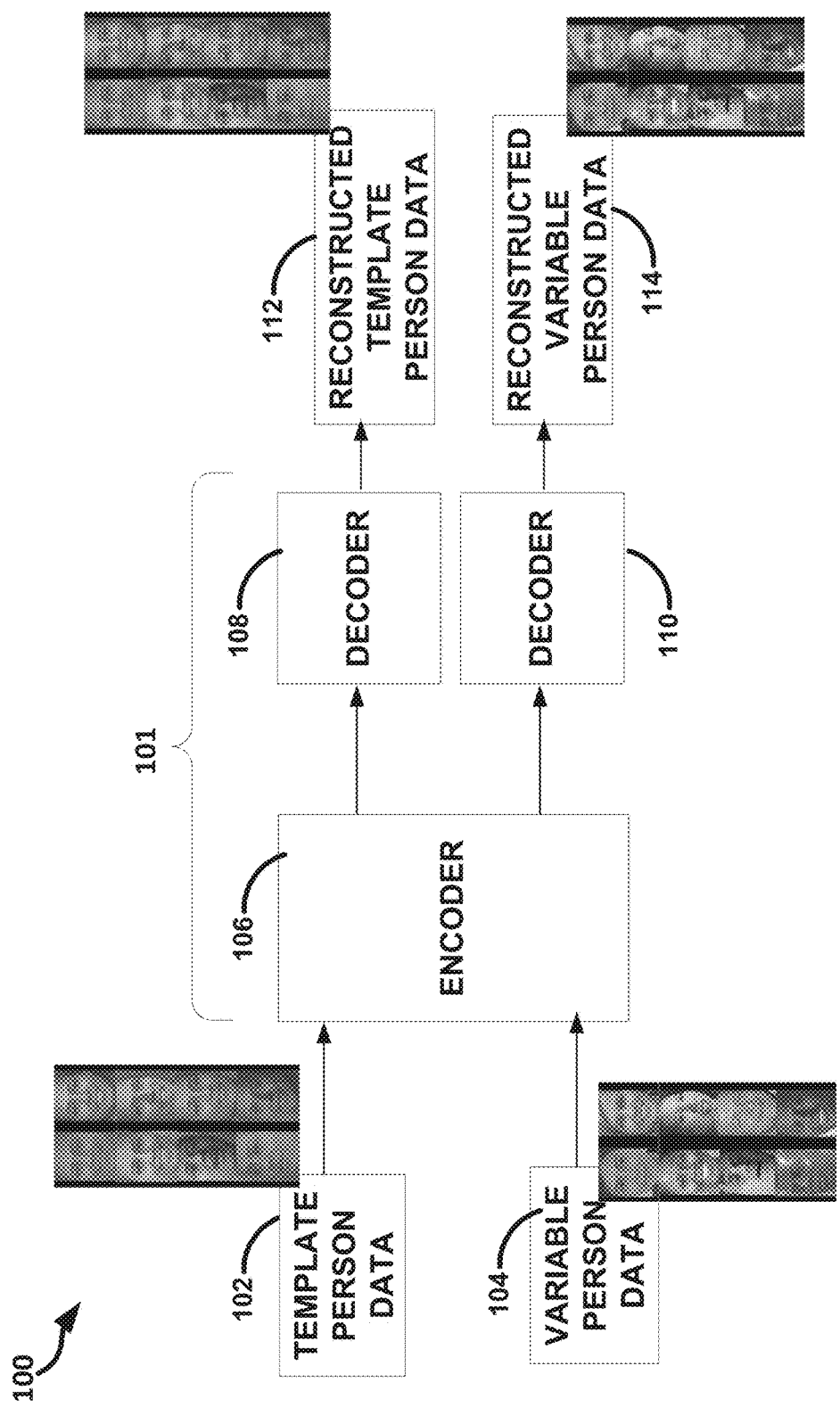
FIG. 1 illustrates, by way of example, a diagram of an embodiment of an autoencoder system for face normalization.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions, operations, or methods may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates (e.g., AND, OR, XOR, negate, or the like), buffers, caches, memories, GPUs, CPUs, FPGAs, ASICs, or the like).Embodiments regard a problem of model (e.g., machine learning (ML) model, such as a neural network (NN) that can include a deep NN (DNN), a convolutional NN (CNN), an autoencoder, or the like) generalization across different groups (a group is a set of people with a distinct, common characteristic). For example, a group can include image, audio, or other data from a one or more people and another group can include data from other one or more people. In another example, one group can include data from one or more people under certain recording settings (e.g., location, such as an office, home, or the like) and another group can include data from the same one or more people under different recording settings (e.g., office, home, or the like).

Embodiments can improve model performance and can also help prevent a potential model bias. While embodiments show performance improvement when considering different groups, there were still some gaps across different data splits (e.g., testing with female subjects yielded better performance). Further improvement can help reduce these biases. Model analysis was performed and showed embodiments improve upon current techniques.

A challenge when deploying ML model systems is the ability to interpret and understand what the models are doing. In contrast to prior work that frequently considered normalizing features with intuitive methods (e.g., range correction, relative changes), embodiments can separate the learning process into two phases: one dedicated to reducing differences across individuals, and another one dedicated to learning FAU recognition. This separation offers an opportunity to examine the output of each ML model after the normalization process. The examination can be used to isolate potential failures in the generalization process. The use of a shared facial appearance can provide a familiar channel of model introspection (faces) that facilitates the intuitive detection of ML model limitations. In general, separating the learning process can help isolating and debugging potential failures.

Human-centered AI deploys ML models for a variety of applications, such as facial expression recognition, pedestrian counting, speech recognition, vital sign monitoring, emotion recognition, among others are desirable in a variety of application domains such as market research, psychotherapy, image captioning, entertainment, traffic control, city planning, virtual assistant, promoting driver safety, among many others. However, large sources of variance, such as those associated with individual facial appearances, voice, biological processes, or the like can limit the potential generalization of the trained models. To help address this problem, embodiments use a DNN (e.g., CNN autoencoder) normalization approach that reduces differences in common characteristics (e.g., facial appearance in the example of facial expression recognition) while preserving one or more variable characteristics (e.g., facial expressions in the example of facial expression recognition).

Embodiments can use a self-supervised denoising autoencoder to transfer facial expressions of different people onto a common, learned facial template. The output of the autoencoder can be used to train and evaluate other human-characteristic recognition models. Using a first benchmark dataset as a reference, performance of embodiments when training and testing within and across individuals, genders (male and female), and skin color types (light and dark), was determined. Embodiments can provide consistent performance gains when normalizing the data. In addition, embodiments can be used to improve cross-dataset generalization with a second benchmark dataset which differs from the first benchmark dataset both in terms of demographics and data collections settings.

A challenge to human-centered ML model applications involves the development of tools that can perform well across different groups of data despite the differences in the data (e.g., different people being represented in the data, different demographics of people, different data collection settings, or the like). In the context of facial expressions recognition, some of the main differences are associated with facial appearance, such as head shape and facial features (e.g., skin type, facial hair, nose, mouth, or ear shape, or the like). As a result, machine learning (ML) models that are trained and tested with data from the same people (sometimes called "person-dependent" (PD) models) usually perform better than those trained and tested with data from different people (sometimes called "person-independent" (PI) models). Similar differences can be observed when considering within and cross-group comparisons in terms of demographics that impact certain facial traits. From the ML perspective, these differences in performance are partly explained by the independent and identically distributed (IID) assumption of the features of people used for training. This assumption requires maintaining as much consistency across training and testing sets to ensure proper generalization performance. These performance differences can be considered analogous to an out-group homogeneity bias and cross-race effect, which has shown that people can better identify the variance of in-group members vs out-across members, and that people are better at recognizing faces from people with similar demographics.

To help merge the gap between in-group and out-group settings, embodiments explore reducing differences across people by transferring the facial expressions to a common single facial representation (sometimes called the template face image) across both training and testing groups. Embodiments can leverage an autoencoder denoising approach that allows transferring the appearance in a self-supervised manner and without any explicit use of FAUs or facial landmarks. Embodiments can leverage facial expression transfer to minimize individual differences in the context of facial action unit recognition.

FIG. 1 illustrates, by way of example, a diagram of an embodiment of an autoencoder system 100 for data normalization. The autoencoder system 100 as illustrated includes a template person data 102 and variable person data 104 as input to an autoencoder 101. The autoencoder 101 is trained to reconstruct the variable person data 104 and the template person data 102 as reconstructed variable data 114 and a reconstructed template data 112, respectively. FIG. 1 illustrates examples of data in the form of images, merely to help illustrate how the normalization operates. Other example forms of data include audio files, video data, sensor data associated with a person, a combination thereof, or the like.

The template person data 102 is one of a plurality of data samples of a same person used in training the autoencoder 101. The plurality of data samples can include the same person with differing characteristics (sometimes called dynamic characteristics) and static characteristics. Example data samples include physiological signals, audio files, images, or the like. In the example of the template data samples being images, the differing characteristics can include facial expressions and the static characteristics can include the facial structure of the template person.

The variable person data 104 is one of a plurality of data samples of one or more people that are used in training the autoencoder 101. The variable person data 104 does not include data used as the template person data 102. The plurality of data samples can include one or more people with differing characteristics and static characteristics.

An autoencoder, such as the autoencoder 101, learns to de-noise an input and copy the denoised input to its output. An autoencoder has an internal layer (a hidden layer) that describes a "code" (sometimes called a "latent feature vector" or "latent feature representation" herein) used to represent the input. The autoencoder 101 includes an encoder 106 that maps the template person data 102 and the variable person data 104 into respective latent feature vectors. The autoencoder 101 includes decoders 108, 110 that map the respective latent feature vectors to a reconstruction of (i) the template person data 102 as the reconstructed template person data 112 and (ii) the variable person data 104 as the reconstructed variable person data 114.

The encoder 106 can be trained using the reconstruction loss terms that accounts for (i) differences between the template person data 102 and the reconstructed template data 112 and (ii) differences between the variable person data 104 and the reconstructed variable data 114. The decoder 108 can be trained using a reconstruction loss term that accounts for differences between the template person data 102 and the reconstructed template data 112. The decoder 110 can be trained using a reconstructions loss term that accounts for differences between the variable person data 104 and the reconstructed variable data 114.

Facial expression transfer and expression synthesis, one example application of embodiments, have been researched recently. Some of the most popular methods start by detecting facial landmarks or FAUs to help guide the transfer process. As embodiments can be used to improve the task of FAU recognition, embodiments do not require any explicit indication of facial landmarks or FAUs. The autoencoder 101 can be self-supervised. The autoencoder 101, as discussed, includes the encoder 106 (E) that reduces the dimensionality of the template person data 102 and the variable person data 104 into a lower dimensional latent space. The decoder 108, Dy, attempts to recover the template person data 102 that includes a reference person selected for the normalization target. The decoder 110, Dx, attempts to recover the variable person data 104 that includes data the individual to be normalized.

During the training phase, that data 102 and 104 are iteratively compressed with the encoder 106. Also, during training, the decoders 108, 110 are trained reduce an error between the data 102, 104 and the reconstructed data 112, 114, respectively. The error can be a root mean squared error (RMSE), an L2 reconstruction loss, a mean square error (MSE), mean absolute error (MAE), R squared (e.g., 1−MSE(model)/MSE(baseline)) or adjusted R squared, mean square percentage error (MSPE), mean absolute percentage error (MAPE), root mean squared logarithmic error (RMSLE).

The training process can alter weights of neurons of the autoencoder 101 based on the following loss functions:

$$\operatorname*{argmin}_{E,D^x} L(X, X') = 1/n \sum_{i=1}^{n} |x_i - D^x(E(x'_i))| \qquad \text{Equation 1}$$

$$\operatorname*{argmin}_{E,D^y} L(Y, Y') = 1/m \sum_{j=1}^{m} |y_j - D^y(E(y'_j))| \qquad \text{Equation 2}$$

where $x_i$ represents the i data 104 of the entity to be normalized, $y_j$ represents the j data 102 of the template of reference, and $x'_i$ and $y'_j$ represent respective, pre-processed versions of the data 104, 102, respectively. The training can be repeated based on data 104 of each entity to be normalized.

As the same encoder 106 is used to generate the latent feature vector that is used to recover both the template data 112 and the variable data 114, the learned latent feature vector is configured to capture the sources of variance shared by the data 102, 104 (e.g., head poses, facial expressions, or the like). The decoders 108, 110 learn to add information that is less variable (facial appearance). As a preprocessing step in some embodiments in which tile data 102, 104 includes images, the input images can be converted to grey scale. In some embodiments, the greyscale pixels values can be corrected with a histogram equalization technique, such as to facilitate a more consistent distribution of pixel values across individuals. Further, an image augmentation technique can be used to increase an amount of variance in the data 102, 104. The image augmentation technique can include a random affine transformation, a Gaussian warp, or the like During runtime, the data 104 of the individual to be normalized can be compressed by the encoder 106 (e.g., without augmentation) and recovered with the template decoder 108 (Dy) that was trained to decode the template person data 102 according to Equation 3:

$$X^y = D^y(E(X)) \qquad \text{Equation 3}$$

where $X^y$ represents the normalized images of the person.

For training, the autoencoder 101 can learn based on a number of data samples of the data 102, 104 (e.g., hundreds or thousands of samples of each of the data 102, 104). In training, a batch of the template person data 102 can be input and followed by a batch of the data 104 from the person to be normalized, or vice versa. The number of data samples of the template person data 102 and variable person data 104 in each batch can be the same or different. A loss determined when the template person data 102 is input can be used to adjust weights of the encoder 106 and the decoder 108, such as by using backpropagation. A loss determined based on the variable person data 104 as input can be used to adjust the weights of the encoder 106 and the decoder 110.

Table 1 and Table 2 show the specific architecture implementation for the encoder 106 and decoders 108, 110, respectively. Note that these architecture implementations are merely examples and many variations are possible, such as the size of the kernels, number of filters, number of strides, type of layer, or the like.

TABLE 1 example encoder 106 network architecture
used to compress facial information

| LAYER | FILTERS, KERNEL SIZE, STRIDES | OUTPUT |
|---|---|---|
| INPUT | — | 128, 128, 1 |
| CONV2D/LEAKYRELU | 128, 5, 2 | 64, 64, 128 |
| CONV2D/LEAKYRELU | 256, 5, 2 | 32, 32, 256 |
| CONV2D/LEAKYRELU | 512, 5, 2 | 16, 16, 512 |
| CONV2D/LEAKYRELU | 1024, 5, 2 | 8, 8, 1024 |
| FLATTEN | — | 65536 |
| DENSE | — | 1024 |
| DENSE | — | 16384 |
| RESHAPE | — | 4, 4, 1024 |
| CONV2D/LEAKYRELU | 2048, 3, — | 4, 4, 2048 |
| PIXELSHUFFLER | — | 8, 8, 512 |

TABLE 2 example decoder 108, 110 network architecture
to recover facial information

| LAYER | FILTERS, KERNEL SIZE, STRIDES | OUTPUT |
|---|---|---|
| INPUT | — | 8, 8, 512 |
| CONV2D/LEAKYRELU | 1024, 3, — | 8, 8, 1024 |
| PIXELSHUFFLER | — | 16, 16, 256 |
| CONV2D/LEAKYRELU | 512, 3, — | 16, 16, 512 |
| PIXELSHUFFLER | — | 32, 32, 128 |
| CONV2D/LEAKYRELU | 256, 3, — | 32, 32, 256 |
| PIXELSHUFFLER | — | 64, 64, 64 |
| CONV2D/LEAKYRELU | 128, 3, — | 64, 64, 128 |
| PIXELSHUFFLER | — | 128, 128, 32 |
| CONV2D/SIGMOID | 1, 5, — | 128, 128, 1 |

Again, regarding the specific application of facial expression recognition, to facilitate transferring as many facial expressions as possible into a single facial appearance, a most expressive subject of an image dataset can be used as a template face of the template person data 102. This most expressive subject is more likely to capture a wider gamut of facial variations than another, less expressive subject. A most expressive subject can include an entity for which the median of labeled FAUs across all action units is the highest in the dataset. Another application of image normalization, besides FAU classification, can include normalizing a view of a person in an online meeting program, such as Zoom, Teams, FaceTime, GoToMeeting, BlueJeans, or the like. The face normalization can provide anonymity while still providing expression. Another application includes a creation of a synthetic reference models, such as an avatar whose facial expression is controlled by another entity, such as an entity pictured in the variable face image 104.

Figure 2:
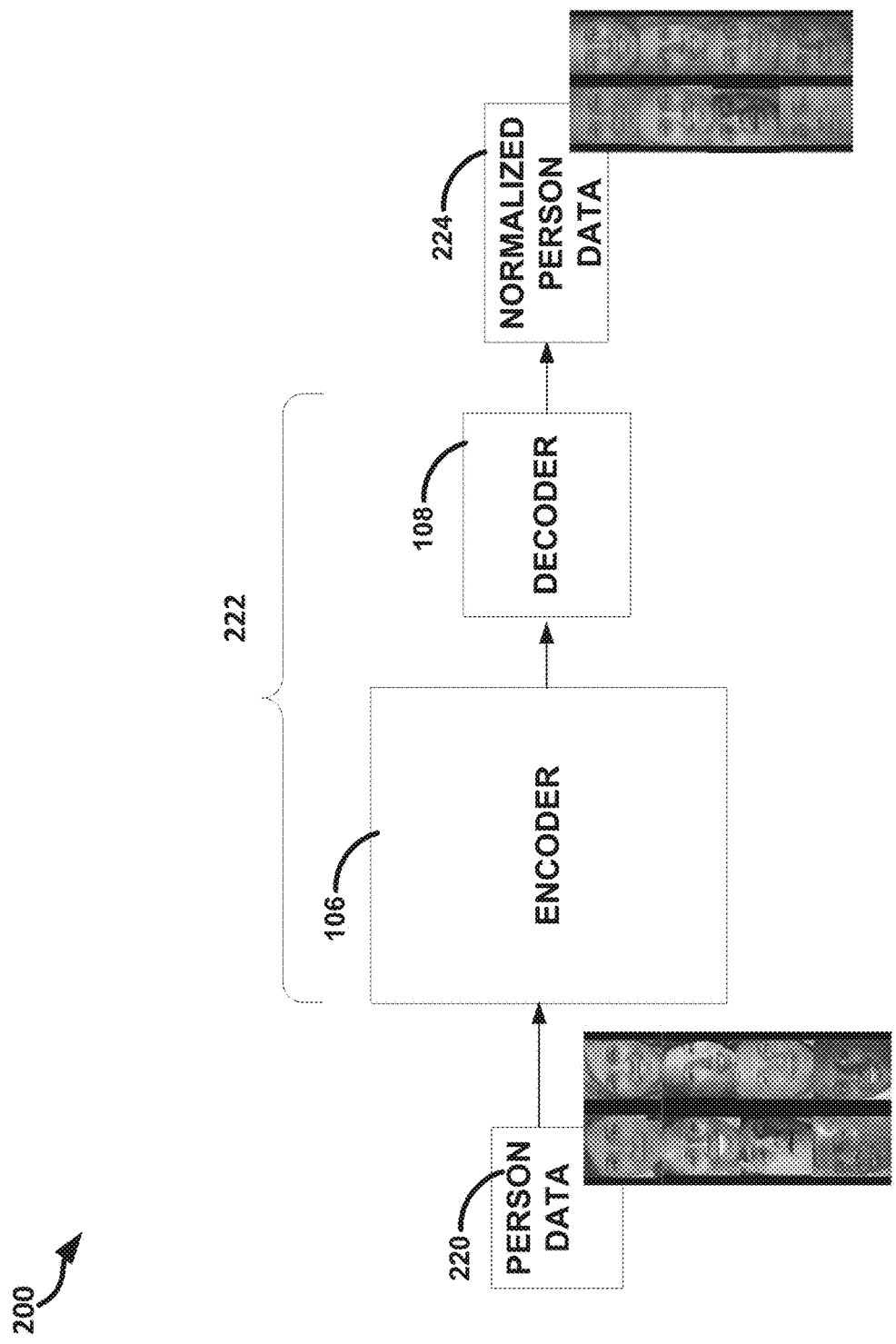
FIG. 2 illustrates, by way of example, a diagram of an embodiment of a system for face normalization.

FIG. 2 illustrates, by way of example, a diagram of an embodiment of a system 200 for human-centric data normalization. Similar to FIG. 1, FIG. 2 illustrates input and output data as images, but other types of data are possible. The system 200 as illustrated includes a person data 220, such as can include data associated with person used to train the encoder 106 and the decoder 110 (see FIG. 1). The person data 220 is input into the encoder 106. The encoder 106 was trained based on the template person data 102 and the variable person data 104. The decoder 108 can reconstruct the person data 220 based on the compression performed by the encoder 106 to generate the normalized person data 224. The normalized person data 224 includes the non-variable components (sometimes called "static characteristics") from the template person data 102 with variable components (sometimes called "dynamic characteristics") (e.g., mouth formation, eye position, head tilt, inflection, accent, or the like) of the person data 220. The normalized person data 224 can be collected for a variety of samples of the person data 220. The normalized person data 224 can be used as input into a human-centric AI model (see FIG. 3), such as to determine a classification of the person data 220, by determining the classification based on the corresponding normalized face image 224.

An application of the personal data normalization performed by FIG. 2 includes user anonymity, such as for an online meeting application, a video call application, person counting, driver safety, or the like. Another application of the face normalization performed by FIG. 2 is improved classification.

Figure 3:
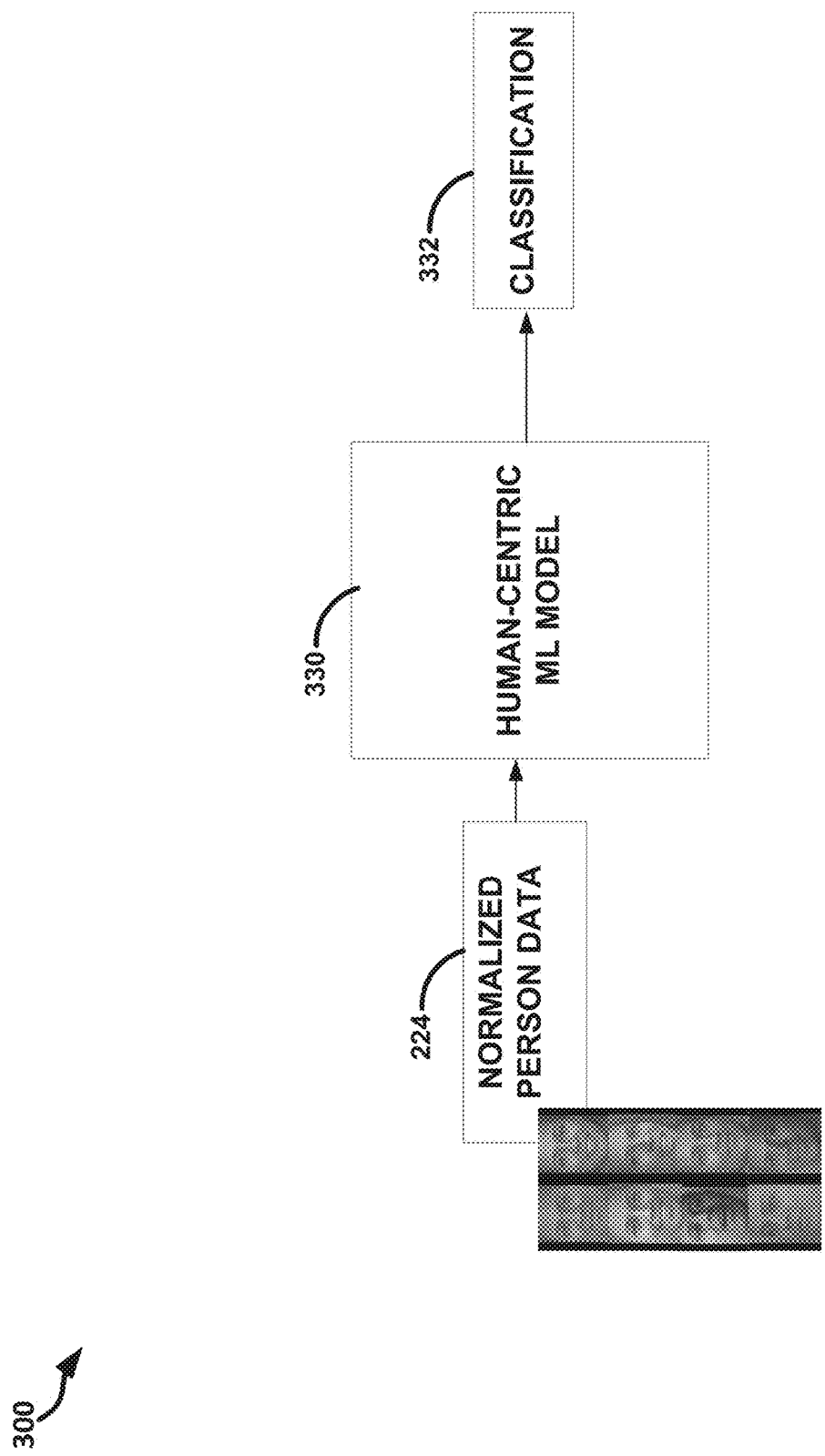
FIG. 3 illustrates, by way of example, a diagram of an embodiment of an FAU classification system.

FIG. 3 illustrates, by way of example, a diagram of an embodiment of a classification system 300. The system 300 as illustrated includes the normalized person data 224 as input to a human-centric ML model 330. The human-centric ML model 330 determines a classification 332 based on the normalized person data 224.

After the variable characteristics of the variable person data 104 are transferred onto static characteristics of common template person data 102 (per FIGS. 1-2), they can be fed into an ML classifier (the human-centric ML model 330). The human-centric ML model 330 can operate on and determine classification 332 for a single data sample. An example human-centric ML model 330 is a LeNet-5 convolutional neural network (CNN) architecture. Other classifiers can be implemented by the human-centric ML model 330.

An example classification 332, in the example of face normalization, is an FAU. An FAU defines an action unit (AU) on the face. An AU corresponds to a relaxation or contraction of a muscle. The muscle, in an FAU is part of the face. Example FAUs include inner brow raiser, outer brow raiser, brow lowerer, cheek raiser, lid tightener, upper lip raiser, lip corner puller, dimpler, lip corner depressor, chin raiser, lip tightener, and lip pressor, among others.

An improvement to the generalization of FAU models across different groups of people is provided by embodiments. To help evaluate, multiple within-group and cross-group evaluations across different group splits were performed. Then embodiments were operated to evaluate whether they improved ML model performance or not.

The following group splits were considered:

Person. The first group split is at the individual-level which is the most frequently considered source of human variance. The within-group evaluations included models that were trained and tested with data from the same person (sometimes called PD models). The cross-group evaluations included models that were trained and tested with data from different people (sometimes called PI models). In this case, person-dependent models capture the optimal performing scenario in which labels and data of the person are available and, consequently, better model generalization can be more easily achieved.

Gentler. The second group split is at the gender-level (male and female) which has been shown to influence facial appearance, voice, and other human differences due to physiological and hormonal differences. In terms of facial images, facial variance in terms of sex-related facial characteristics include an amount of hair or the shape of the jaw. The within-group evaluations included models that were trained and tested with only male participants and other models that were trained and tested with only female participants. The cross-group evaluations included models that were trained with only male participants and tested with only female participants, and vice versa. For convenience, these models are called "gender-dependent" (GD) and "gender-independent" (GI) models, respectively. However, both of these types of models fall under the category of person-independent models as the subjects used for training and validation were different than the ones used for testing.

Skin Type. The third group split is at the skin type level (lighter and darker) which has been shown to impair facial analysis due to the differences in type distributions. The within-group evaluations included models that were trained and tested only with participants with lighter skin type as well as models that were trained and tested only with participants with darker skin type (sometimes called "skin-dependent" (SD) models). Cross-group evaluations included models that were trained with participants with lighter skin type and tested with those with darker skin type, and vice versa (sometimes called "skin-independent" (SI) models). One technique for annotating skin type is the Fitzpatrik Prototype Scale which separates skin types into six main categories.

Dataset. The fourth and final group split is at the dataset-level which includes variance due to many factors, such participant demographics and data collection settings. The within-group evaluations included models that were trained and tested with participants from the same dataset (sometimes called "database-dependent" (DD) models). The cross-group evaluations included models that were trained with data samples from one dataset and tested with those from another dataset (sometimes called "database independent" (DI)models).

Performance of embodiments was evaluated under the different group splits and leverages the first benchmark dataset (1BD) dataset. To study cross-dataset generalization, the second benchmark dataset (2BD) was also employed.

Table 3 shows a summary overview of some of the results.

When evaluating the models with normalized images (output of FIG. 2), PI model accuracy increased to 59.6% which is higher than its unnormalized PI counterpart (p<0.001) and very similar to the unnormalized PD results (p=0.375). This finding suggests that embodiments can effectively reduce individual differences associated with appearance. PD models with normalized images maintained a performance of 61.4% which is similar to its unnormalized counterpart (p=0.388), suggesting that a face transfer process of embodiments does not lose relevant facial expression information.

To capture the overall performance for each model, an average between an F1-score and accuracy for each of the action units (at a threshold of 0.5), and then aggregated them for each of the participants. For each of the conditions, the average and standard deviation was computed across all the participants. To compare performance across conditions, a two-sample t-test with a significance score when $p<0.05$ was used.

TABLE 3

Analysis Results Summary

| Condition | Group | Dataset | Analysis | Train-> Test | Reps | Original | Normalized |
|---|---|---|---|---|---|---|---|
| PD | Person | 1BD | Within | Task-> Task | 20 × 40 | 60.3(3.8) | 61.1(4.0) |
| PI | Person | 1BD | Cross | People-> People | 20 × 2 | 55.0(3.7) | 59.6(3.6) |
| ST | Skin Type | 1BD | Within | Lighter-> Lighter Darker-> Darker | 20 × 2 | 55.2(6.5) | 58.7(4.6) |
| SI | Skin Type | 1BD | Cross | Lighter-> Darker Darker-> Lighter | 20 × 2 | 49.9(5.1) | 57.4(4.0) |
| GD | Gender | 1BD | Within | Male-> Male Female-> Female | 20 × 2 | 55.0(4.3) | 60.2(3.8) |
| GI | Gender | 1BD | Cross | Male-> Female Female-> Male | 20 × 2 | 52.6(3.9) | 57.7(3.2) |
| DD | Dataset | 1BD 2BD | Within | 1BD-> 1BD 2BD-> 2BD | 20 × 2 | 54.0(4.7) | 61.5(5.1) |
| DI | Dataset | 1BD 2BD | Cross | 1BD-> 2BD 2BD-> 1BD | 20 × 2 | 44.6(4.8) | 51.1(5.1) |

When using the original data (un-normalized data), GI models achieved an average score of 52.6% and GD models achieved an average score of 55% which were significantly different (p=0.009). This difference indicates that the impact of having different genders across training and testing sets is around 2.4% in this dataset. When using normalized images, the GI models increased to 57.7% which is higher than its unnormalized counterpart (p<0.001) and GS models increased to 60.2% which was also higher than its unnormalized counterpart (p<0.001). That GI models operating on normalized images yielded higher results than GD models without normalized images indicates that the normalization is helping address individual differences beyond gender and that embodiments normalize differences at the individual level. The use of image normalization yielded a consistent average improvement of 5.2% across the different conditions.

When using unnormalized images, SI models achieved an average score of 49.9% and SD models achieved an average score of 55.2% which were significantly different (p=0.025). This difference indicates that the impact of having different skin types across training and testing sets is around 5.3% which is a bit larger than the generalization gap associated with gender (2.4%). This finding seems to suggest that skin type may have a greater impact than gender in the context of model generalization. However, the number of subjects in the skin type condition is smaller than in the gender condition.

When using normalized images, SI models increased to 57.4% which is higher than its unnormalized counterpart (p<0:001) and SD models increased to 58.7% which is similar to its unnormalized counterpart (p=0.110). In this case, SI models with normalized images yielded higher but comparable results than SD models with unnormalized images (p=0.290), suggesting that the normalization method addressed the main source of data variance in this condition.

Image normalization yields a consistent average improvement of 5.7% across the different conditions. This difference is the smallest when training and testing with people with darker skin, in which performance was already at the level of PD models (around 60

When using unnormalized images, DI models achieved an average score of 44.6% and DD models achieved an average score of 54% which is different (p<0.001). This difference indicates that the impact of having different datasets across training and testing sets is around 9.4%. This difference is the largest observed gap across all the group conditions indicating that cross-dataset generalization is one of the most difficult challenges to address.

When using normalized images, DI models increased to 51.1% which is higher than its unnormalized counterpart (p<0.001) and DD models increased to 61.5% which is also higher than its unnormalized counterpart (p<0:001).

Regarding FAU classification, embodiments provided an average improvement of around 4.6% (STD: 2.9) for the considered AU with the greatest gains for AU04 (11.4%) and the smallest gains for AU14 (0.8%).

Figure 4:
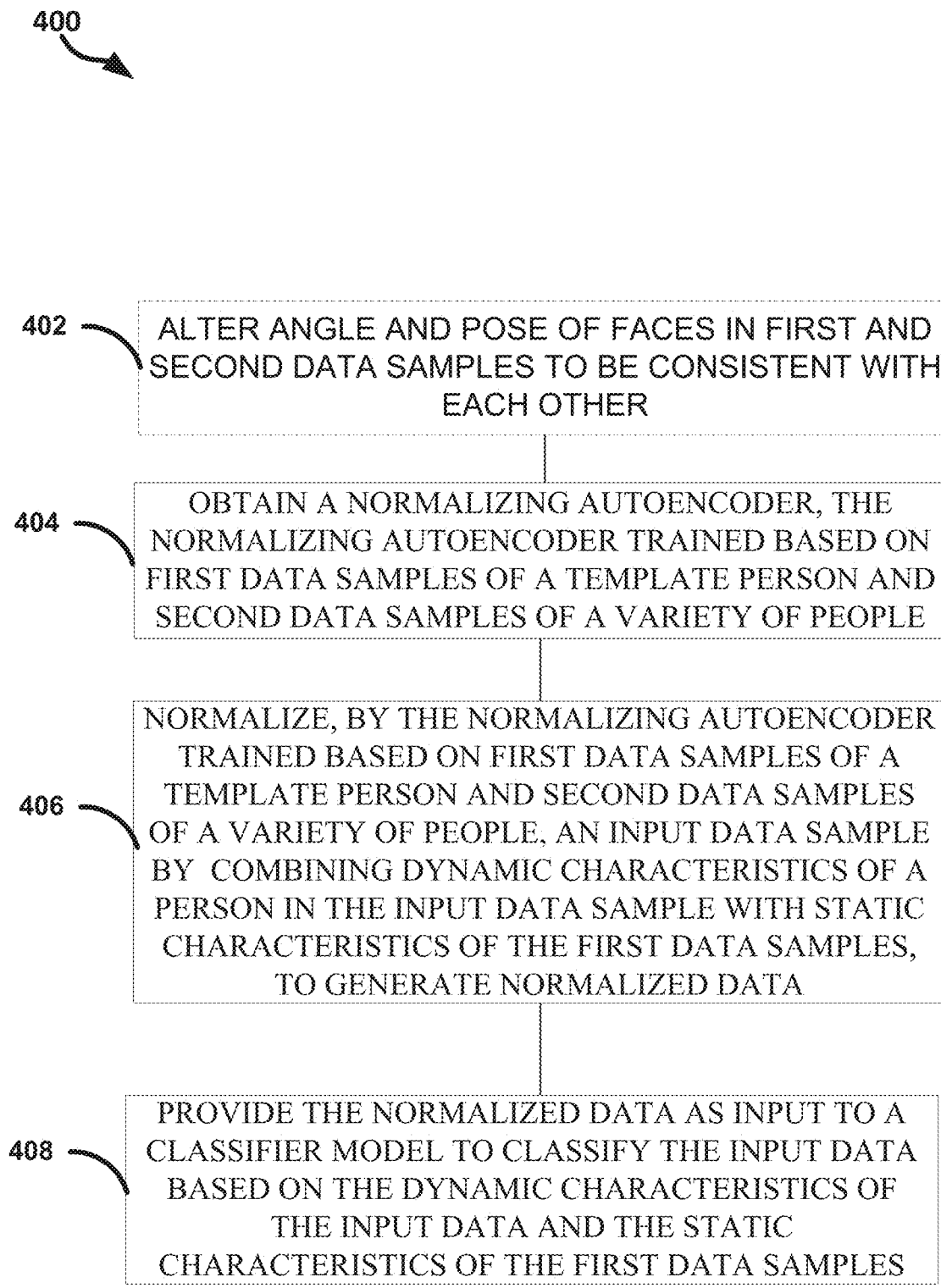
FIG. 4 illustrates, by way of example, a diagram of an embodiment of a method for face image normalization using an autoencoder.

FIG. 4 illustrates, by way of example, a diagram of an embodiment of a method 400 for image normalization using an autoencoder. The method 400 as illustrated includes (optionally) altering an angle and pose of faces in first and second data samples to be consistent with each other, at operation 402; obtaining a normalizing autoencoder, the normalizing autoencoder trained based on first data samples of a template person and second data samples of a variety of people, at operation 404; normalizing, by the normalizing autoencoder, an input data sample by combining dynamic characteristics of a person in the input data sample with static characteristics in the first data samples, to generate normalized data, at operation 406; and providing the normalized data as input to a classifier model to classify the input data based on the dynamic characteristics of the input data and the static characteristics of the first data samples, at operation 408.

The method 400 can further include, wherein the normalizing autoencoder is trained using a single encoder and multiple decoders, a first decoder of the decoders dedicated to reconstructing the first data samples and a second decoder of the decoders dedicated to reconstructing the second data samples. The method 400 can further include, wherein the encoder is trained based on a reconstruction loss of both the first and second decoders. The method 400 can further include, wherein the first decoder is trained based on a reconstruction loss of only the first decoder and the second decoder is trained based on a reconstruction loss of only the second decoder. The method 400 can further include, wherein, during runtime, the normalizing autoencoder operates using the encoder and the second decoder on the input data. The method 400 can further include training the encoder and the first decoder on a batch of the second data of the variable person followed by training the encoder and the second decoder on a batch of the first data of the template person, or vice versa.

The method 400 can further include, wherein the first data samples are images of a template face, the second data samples are images of a variety of faces, the input data is an image of a face to be normalized, and the classifier model provides a classification of a facial action unit (FAU) present in the input image. The operation 402 can be performed in instances when the first and second data samples are images of faces. The method 400 can further include, wherein the static characteristics include a facial structure and the dynamic characteristics include mouth formation and eyelid formation.

The operation 402 can be performed in a variety of ways. Many techniques currently exist for determining and altering pose and angle of a face of an image. Any of these techniques can be used at operation 402. The operation 402 can adjust the angle and pose of the face to be a frontal view.

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons), Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 5:
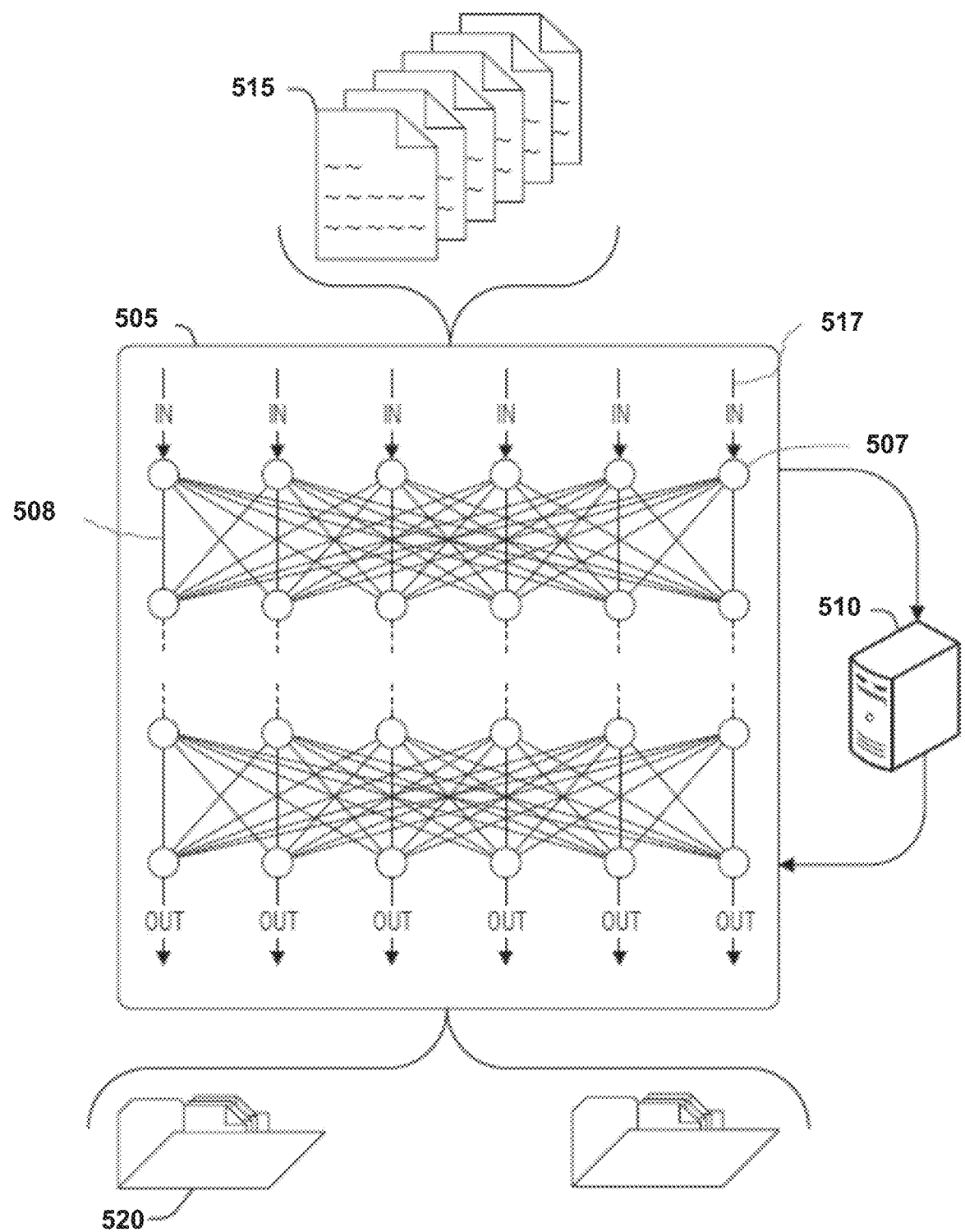
FIG. 5 illustrates, by way of example a block diagram of an example of an environment including a system for neural network training.

FIG. 5 is a block diagram of an example of an environment including a system for neural network training, according to an embodiment. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as red, green, and blue pixel values and intensity values for an image, pitch and volume values at discrete times for speech recognition, and/or amplitude, frequency, magnitude, or the like for a vital sign, such as cardiac activity, respiratory wave, or the like. Each value of the training or input 517 to be classified once ANN 505 is trained, is provided to a corresponding node 507 in the first layer or input layer of ANN 505. The values propagate through the layers and are changed by the objective function.

As noted above, the set of processing nodes is arranged to train the neural network to create a trained neural network.

Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
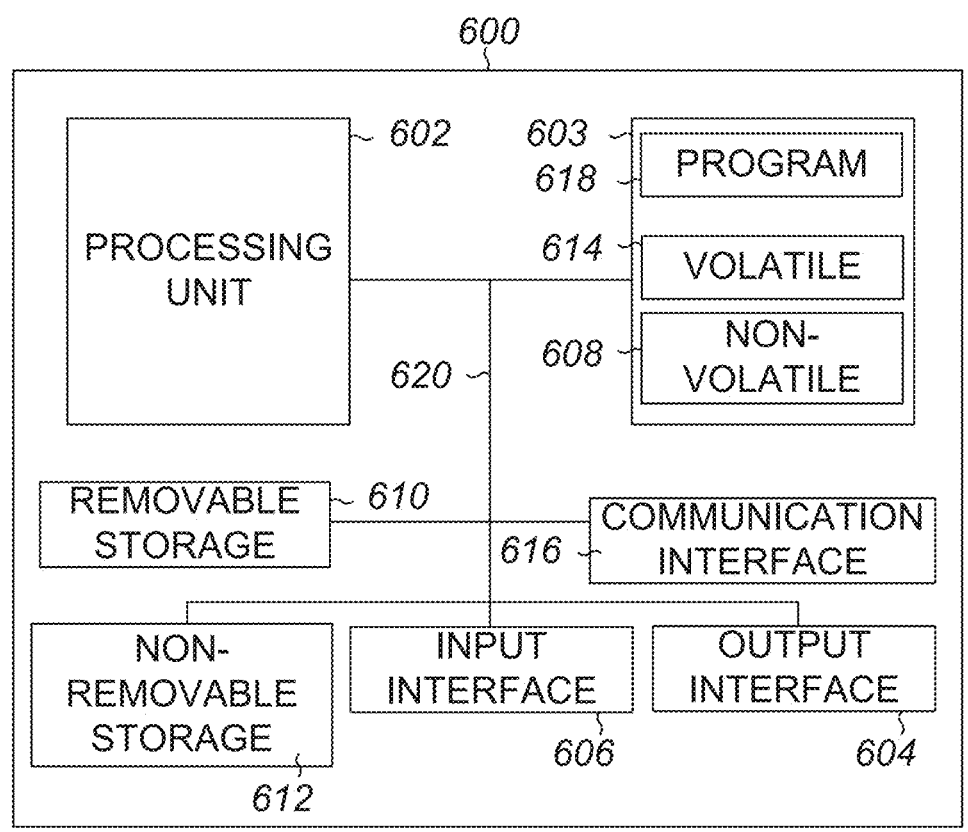
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for image normalization using an autoencoder. The autoencoder 101, 222, FAU model 330, or a component thereof can include one or more of the components of the machine 600. One or more of the autoencoder 101, 222, FAU model 330, or a component thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 818 may be used to cause processing unit 602 to perform one or more methods or algorithms described herein.

ADDITIONAL NOTES AND EXAMPLES

Example 1 includes a device comprising processing circuitry, a memory including instructions that, when executed by the processing circuitry, cause the processing circuitry to perform operations, the operations comprising normalizing, by a normalizing autoencoder trained based on first data samples of a template person and second data samples of a variety of people, an input data sample by combining dynamic characteristics of a person in the input data sample with static characteristics of the first data samples, to generate normalized data, the static characteristics including characteristics that are the same among the first data samples, and providing the normalized data as input to a classifier model to classify the input data sample based on the dynamic characteristics of the the input data sample and the static characteristics of the first data samples.

In Example 2, Example 1 can further include, wherein the normalizing autoencoder is trained using a single encoder and multiple decoders, a first decoder of the decoders dedicated to reconstructing the first data samples and a second decoder of the decoders dedicated to reconstructing the second data samples.

In Example 3, Example 2 can further include, wherein the encoder is trained based on a reconstruction loss of both the first and second decoders.

In Example 4, Example 3 can further include, wherein the first decoder is trained based on a reconstruction loss of only the first decoder and the second decoder is trained based on a reconstruction loss of only the second decoder.

In Example 5, Example 4 can further include, wherein, during runtime, the normalizing autoencoder operates using the encoder to compress a the representation of the input data sample and the first decoder to construct the normalized data.

In Example 6. Example 5 can further include, wherein the operations further comprise training the encoder and the second decoder on a batch of the second data samples followed by training the encoder and the first decoder on a batch of the first data samples, or vice versa.

In Example 7, at least one of Examples 1-6 can further include, wherein the first data samples are images of a template face, the second data samples are images of a variety of faces, the input data is an image of a face to be normalized, and the classifier model provides a classification of a facial action unit (FAU) present in the input image.

In Example 8, Example 7 can further include, wherein the operations further comprise, before normalizing the input data, adjusting angle and pose of the faces in the first and second data samples to be consistent and wherein normalizing is performed based on input data that is adjusted for angle and pose.

In Example 9, at least one of Examples 7-8 can further include, wherein the static characteristics include a facial structure and the dynamic characteristics include mouth formation and eyelid formation.

Example 10 can include a computer-implemented method comprising obtaining a normalizing autoencoder, the normalizing autoencoder trained based on first data samples of a template person and second data samples of a variety of people, normalizing, by the normalizing autoencoder, an input data sample by combining dynamic characteristics of a person in the input data sample with static characteristics in the first data samples, to generate not finalized data, and providing the normalized data as input to a classifier model to classify the input data based on the dynamic characteristics of the input data and the static characteristics of the first data samples.

In Example 11, Example 10 can further include, wherein the normalizing autoencoder is trained using a single encoder and multiple decoders, a first decoder of the decoders dedicated to reconstructing the first data samples and a second decoder of the decoders dedicated to reconstructing the second data samples.

In Example 12, Example 11 can further include, wherein the encoder is trained based on a reconstruction loss of both the first and second decoders.

In Example 13, Example 12 can further include, wherein the first decoder is trained based on a reconstruction loss of only the first decoder and the second decoder is trained based on a reconstruction loss of only the second decoder.

In Example 14, Example 13 can further include, wherein during runtime, the normalizing autoencoder operates using the encoder and the second decoder on the input data.

In Example 15, Example 14 can further include training the encoder and the first decoder on a batch of the second data of the variable person followed by training the encoder and the second decoder on a batch of the first data of the template person, or vice versa.

In Example 16, at least one of Examples 10-15 can further include, wherein the first data samples are images of a template face, the second data samples are images of a variety of faces, the input data is an image of a face to be normalized, and the classifier model provides a classification of a facial action unit (FAU) present in the input image.

In Example 17, Example 16 can further include, before normalizing the input data, adjusting angle and pose of the faces in the first and second data samples to be consistent and wherein normalizing is performed based on input data that is adjusted for angle and pose.

In Example 18, at least one of Examples 16-17 can further include, wherein the static characteristics include a facial structure and the dynamic characteristics include mouth formation and eyelid formation.

Example 19 can include a non-transitory machine-readable medium including instructions that, when executed by a machine, cause the machine to perform operations comprising normalizing, by a normalizing autoencoder trained based on first data samples of a template person and second data samples of a variety of people, an input data sample by combining dynamic characteristics of a person in the input data sample with static characteristics of the first data samples, to generate normalized data, the static characteristics including characteristics that are the same among the first data samples, and providing the normalized data as input to a classifier model to classify the input data sample based on the dynamic characteristics of the input data sample and the static characteristics of the first data samples.

In Example 20, Example 19 can further include, wherein the normalizing autoencoder is trained using a single encoder and multiple decoders, a first decoder of the decoders dedicated to reconstructing the first data samples and a second decoder of the decoders dedicated to reconstructing the second data samples.

In Example 21, Example 20 can further include, wherein the encoder is trained based on a reconstruction loss of both the first and second decoders.

In Example 22, Example 21 can further include, wherein the first decoder is trained based on a reconstruction loss of only the first decoder and the second decoder is trained based on a reconstruction loss of only the second decoder.

In Example 23, Example 22 can further include, wherein, during runtime, the normalizing autoencoder operates using the encoder to compress a the representation of the input data sample and the first decoder to construct the normalized data.

In Example 24, Example 23 can further include, wherein the operations further comprise training the encoder and the second decoder on a batch of the second data samples followed by training the encoder and the first decoder on a batch of the first data samples, or vice versa.

In Example 25, at least one of Examples 19-24 can further include, wherein the first data samples are images of a template face, the second data samples are images of a variety of faces, the input data is an image of a face to be normalized, and the classifier model provides a classification of a facial action unit (FAU) present in the input image.

In Example 26, Example 25 can further include, wherein the operations further comprise, before not finalizing the input data, adjusting angle and pose of the faces in the first and second data samples to be consistent and wherein normalizing is performed based on input data that is adjusted for angle and pose.

In Example 27, Example 26 can further include, wherein the static characteristics include a facial structure and the dynamic characteristics include mouth formation and eyelid formation.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims,

What is claimed is:

1. A device comprising:
   processing circuitry;
   a memory including instructions that, when executed by the processing circuitry, cause the processing circuitry to perform operations, the operations comprising:
   obtaining facial image data (FID) of an image of a first face;
   adjusting the FID such that angle and pose of the face is consistent with corresponding angle and pose of faces in first facial image data samples of a variety of people resulting in adjusted FID;
   manipulating, by a normalizing autoencoder, the adjusted FID resulting in normalized FID (NFID), the normalizing autoencoder (i) trained based on second facial image data samples of a template person different from the variety of people and the first facial image data samples and (ii) including (a) a single encoder trained based on both the first and second facial image data samples, (b) a first decoder trained based on only the second facial image data samples, and (c) a second decoder trained based on only the first facial image data samples, the manipulating including combining dynamic characteristics of the first face with static characteristics of a second face of the template person in the second facial image data samples, to generate the NFID, the static characteristics including characteristics that are the same among the second data samples;
   providing the NFID as input to a facial action unit (FAU) classifier model to classify FAUs in the NFID based on the dynamic characteristics of the first face and the static characteristics of the second face; and
   receiving, from the FAU classifier model, FAUs of the first face.

2. The device of claim 1, wherein the first decoder is dedicated to reconstructing the second facial image data samples and the second decoder is dedicated to reconstructing the first facial image data samples.

3. The device of claim 2, wherein the encoder is trained based on a reconstruction loss of both the first and second decoders.

4. The device of claim 3, wherein the first decoder is trained based on a reconstruction loss of only the first decoder and the second decoder is trained based on a reconstruction loss of only the second decoder.

5. The device of claim 4, wherein, during runtime, the normalizing autoencoder operates using the encoder to compress a representation of the FID and the first decoder to construct the NFID.

6. The device of claim 5, wherein the operations further comprise training the encoder and the second decoder on a batch of the first facial image data samples followed by training the encoder and the first decoder on a batch of the second facial image data samples, or vice versa.

7. The device of claim 1, wherein the static characteristics include a facial structure and the dynamic characteristics include mouth formation and eyelid formation.

8. A computer-implemented method comprising:
   obtaining facial image data (FID) of an image of a first face;
   adjusting the FID such that angle and pose of the face is consistent with corresponding angle and pose of faces in first facial image data samples of a variety of people resulting in adjusted FID;
   obtaining a normalizing autoencoder, the normalizing autoencoder (i) trained based on second facial image data samples of a template person different from the variety of people and the first facial image data samples and (ii) including (a) a single encoder trained based on both the first and second facial image data samples, (b) a first decoder trained based on only the second facial image data samples of a template person, and (c) a second decoder trained based on only the first facial image data samples;
   manipulating, by the normalizing autoencoder, the adjusted FID resulting in normalized FID (NFID), the manipulating including combining dynamic characteristics of the first face with static characteristics of a second face of the template person in the second facial image data samples, to generate the NFID; providing the NFID as input to a facial action unit (FAU) classifier model to classify FAUs in the NFID based on the dynamic characteristics of the first face and the static characteristics of the second face; and receiving, from the FAU classifier model, FAUs of the first face.

9. The method of claim 8, wherein the first decoder is dedicated to reconstructing the second facial image data samples and the second decoder is dedicated to reconstructing the first facial image data samples, wherein the encoder is trained based on a reconstruction loss of both the first and second decoders, and wherein the first decoder is trained based on a reconstruction loss of only the first decoder and the second decoder is trained based on a reconstruction loss of only the second decoder.

10. The method of claim 9, wherein during runtime, the normalizing autoencoder operates using the encoder and the first decoder on the adjusted FID.

11. The method of claim 9, wherein the static characteristics include a facial structure and the dynamic characteristics include mouth formation and eyelid formation.

12. A non-transitory machine-readable medium including instructions that, when executed by a machine, cause the machine to perform operations comprising:

obtaining facial image data (FID) of an image of a first face;

adjusting the FID such that angle and pose of the face is consistent with corresponding angle and pose of faces in first facial image data samples of a variety of people resulting in adjusted FID;

manipulating, by a normalizing autoencoder, the adjusted FID resulting in normalized FID (NFID), the normalizing autoencoder trained based on second facial image data samples of a template person different from the variety of people and the first facial image data samples, the manipulating including combining dynamic characteristics of the first face with static characteristics of a second face of the template person, the static characteristics including characteristics that are the same among the second facial image data samples, the normalizing autoencoder including (a) a single encoder trained based on both the first and second facial image data samples, (b) a first decoder trained based on only second facial image data samples of a template person, and (c) a second decoder trained based on only first facial image data samples;

providing the NFID as input to a facial action unit (FAU) classifier model to classify FAUs in the NFID based on the dynamic characteristics of the first face and the static characteristics of the second face; and receiving, from the FAU classifier model, FAUs of the first face.

13. The non-transitory machine-readable medium of claim 12, wherein the first decoder is dedicated to reconstructing the second facial image data samples and the second decoder is dedicated to reconstructing the first facial image data samples.

14. The non-transitory machine-readable medium of claim 13, wherein the encoder is trained based on a reconstruction loss of both the first and second decoders, and wherein the first decoder is trained based on a reconstruction loss of only the first decoder and the second decoder is trained based on a reconstruction loss of only the second decoder.

15. The non-transitory machine-readable medium of claim 14, wherein during runtime, the normalizing autoencoder operates using the encoder and the second decoder on the adjusted FID.

16. The non-transitory machine-readable medium of claim 12, wherein the static characteristics include a facial structure and the dynamic characteristics include mouth formation and eyelid formation.

* * * * *